Sept. 6, 1932.  F. M. ARNOLD  1,876,129
VARIABLE MOTION DEVICE
Filed Aug. 21, 1931   2 Sheets-Sheet 1

F. M. Arnold, INVENTOR
BY Victor J. Evans and Co.
ATTORNEY

Sept. 6, 1932. F. M. ARNOLD 1,876,129
VARIABLE MOTION DEVICE
Filed Aug. 21, 1931 2 Sheets-Sheet 2
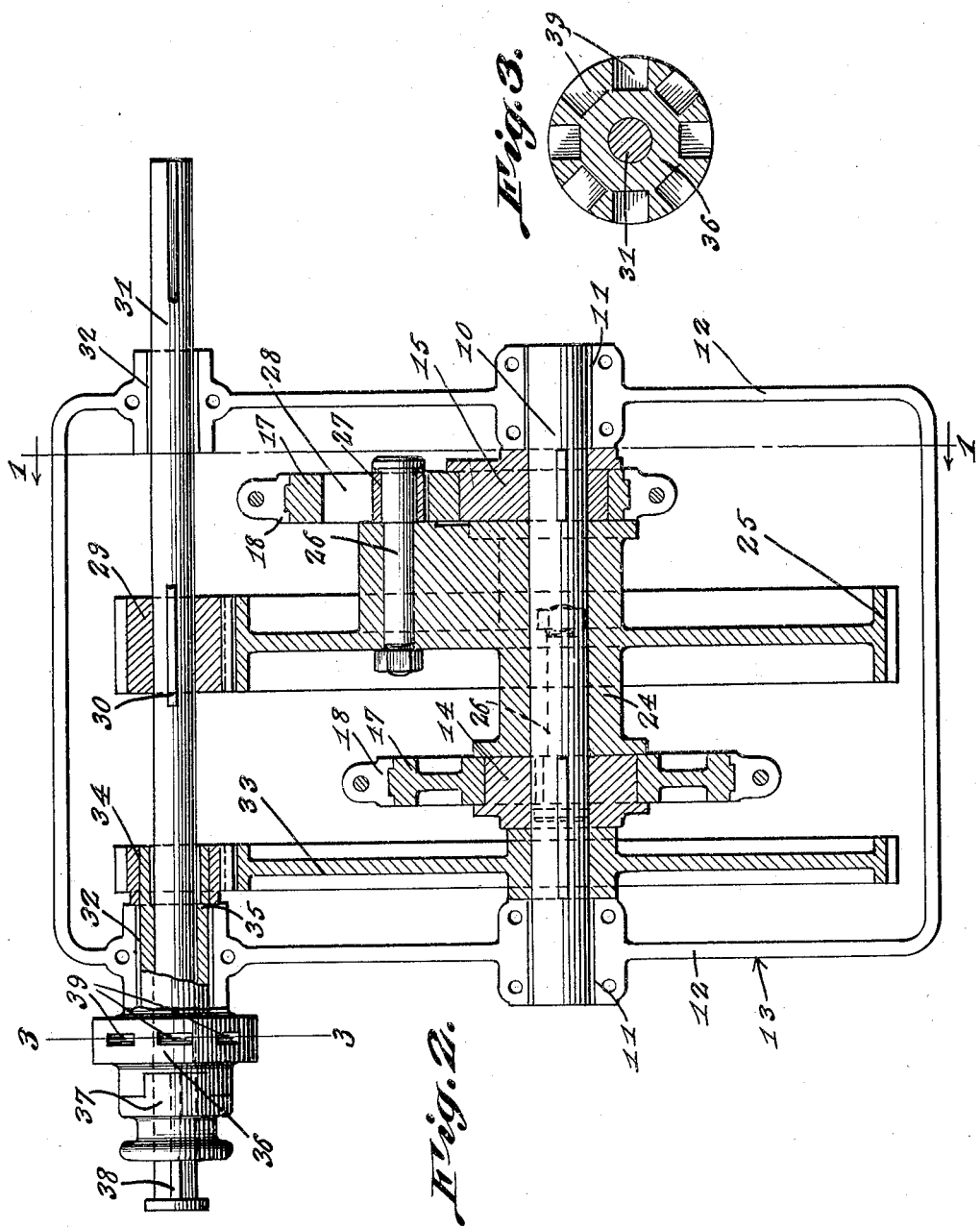

Patented Sept. 6, 1932

1,876,129

UNITED STATES PATENT OFFICE

FRED M. ARNOLD, OF CHATTANOOGA, TENNESSEE

VARIABLE MOTION DEVICE

Application filed August 21, 1931. Serial No. 558,574.

The invention relates to a variable motion device, and more particularly to stroke length changing mechanism for use in pumping machinery or other types of machines.

The primary object of the invention is the provision of a device or mechanism of this character wherein the throw of the crank, pitman or other driving connection in pumping machinery or other machinery can be regulated to vary the length of the stroke and in this manner control the output of such machinery, that is, the volume and pressure if it be a pump or the work performed by other kinds of machinery, the device or mechanism being novel in form and is readily and easily changed for the purposes specified.

Another object of the invention is the provision of a device or mechanism of this character wherein a change in the output of the machinery can be had without altering or changing the speed of the crank shaft or power unit, as the stroke of its pitman or other driving connection can be altered as to the throw thereof, as in pumps the shorter the stroke the greater the output pressure thereof and in the changing of the stroke the speed of the crank shaft and power unit remains constant.

A further object of the invention is the provision of a device or mechanism of this character wherein on adjustment of the pitman or driving connection the throw of the same can be increased or decreased and the adjustment had with dispatch, the device or mechanism being especially adaptable for use in pumping machinery, although the same may be applied to other machinery wherein it may be required to lengthen or shorten the stroke for varying the working operation of the same.

A still further object of the invention is the provision of a device or mechanism of this character wherein the means for varying the throw of the pitman, driving connection or the like is readily accessible and adjustable with dispatch and without excessive labor on the part of an operator.

A still further object of the invention is the provision of a device or mechanism of this character which is extremely simple in construction, possessing but few parts, readily and easily accessible, thoroughly reliable and efficient in operation, strong, durable, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 2 is a vertical transverse sectional view thereof.

Figure 3 is a sectional view on the line 3—3 of Figure 1.

Similar reference characters indicate corresponding parts throughout the several views in the drawings.

Figure 1:
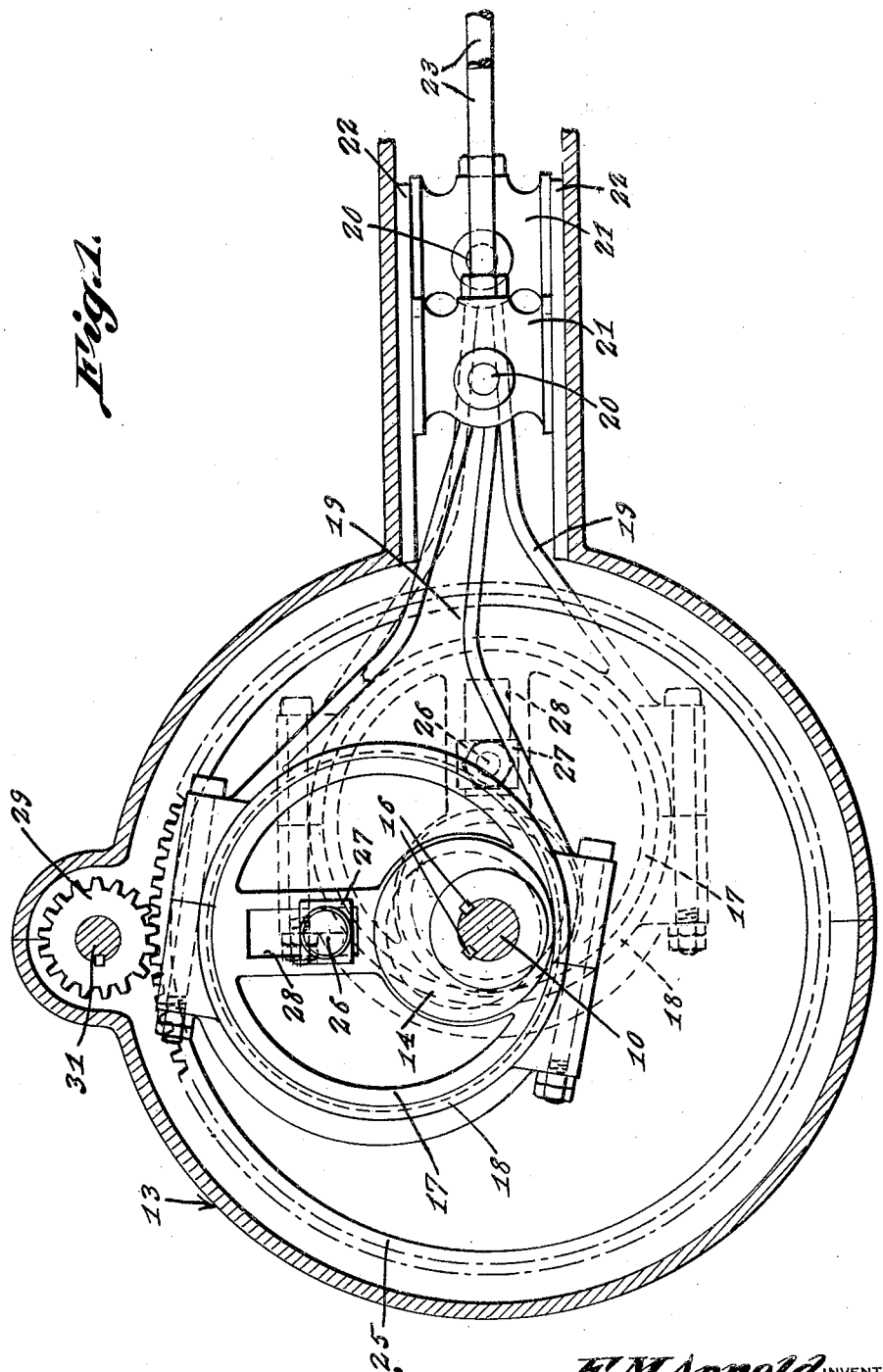
Figure 1 is a fragmentary vertical sectional view of the device or mechanism constructed in accordance with the invention.

Referring to the drawings in detail, 10 designates generally a main shaft which may be termed the crank shaft or eccentric shaft, the latter being journaled in suitable bearings 11 formed in opposite ends or cheeks 12 of a housing 13 and this shaft has splined or keyed thereon spaced inner eccentrics 14 and 15 respectively, the spline or keys being indicated at 16 and such eccentrics carry outer eccentrics 17. About these outer eccentrics 17 are loosely engaged the connecting straps 18 of connecting rods, pitmen or other throw members 19, the latter being pivoted at 20 in cross heads 21 reciprocatorily mounted in crosshead guides 22 forming continuations of the housing 13 and these crossheads through the medium of connectors 23 operate the pumping machinery or other mechanism controllable by the device or mechanism constituting the present invention.

Arranged between the eccentrics 14 and 15 and loose upon the shaft 10 is the hub 24 of a gear 25 which has mounted therein spaced reversely directed wrist pins 26, these being disposed the required distance apart and each engaged in a slidable box 27 fitted in a guide slot 28 formed in each outer eccentric 17 so that the eccentrics will be driven from the gear 25. The gear 25 meshes with a pinion 29 keyed or splined at 30 to a driving shaft 31 journaled in bearings 32 in the ends or cheeks 12 of the housing 13 and this shaft at one end is adapted to be connected with a power unit (not shown).

The shaft 10 has splined or keyed thereto by one of the keys 16 for one of the eccentrics on said shaft a gear 33, the latter meshing with a pinion 34 fixed to a sleeve 35 loose upon the shaft 31 and mounted in one of the bearings 32 for the latter. This sleeve 35 protrudes outwardly from the housing 12 and has fixed thereto at its outer end portion one member 36 of a clutch, the other member 37 of said clutch being splined or keyed at 38 to said shaft 31 and this member 37 is thrown into and out of engagement with the member 36 in any suitable manner, preferably manually controlled and when the member 37 is engaged with the member 36 the pinion 34 is made fast upon shaft 31.

The member 36 of the clutch in its periphery is formed with radially disposed sockets 39 for accommodating a spanner or other tool to permit the manual turning thereof and this adjustment is made only when the member 37 of said clutch is disengaged from the member 36 thereof and in this fashion the eccentrics 14 and 15 can be adjusted to vary the throw of the rods, pitmen or members 19. The inner eccentrics 14 and 15 under adjustment are turned within the outer eccentrics 17 whereby the centers of the latter are drawn nearer to or further away from the center of the shaft 10, thereby varying the throw or stroke of each member 19 hereinbefore referred to.

The gear 25 and pinion 29 and gear 33 and pinion 34 on the shafts 10 and 31 respectively are of the same ratio so that said gears will rotate at the same speed irrespective of the change of stroke or strokes of the members 19, while the shafts operate at different speeds and also the altering of the position of the eccentrics 14 and 15 within the eccentrics 17 as should be apparent.

What is claimed is:—

1. In mechanism of the class described comprising a plurality of shafts, inner eccentrics fixed to one of the shafts, outer eccentrics loosely mounted on the inner eccentrics, gears on the shaft carrying the inner eccentrics, one gear being fixed and the other loose thereon, a pinion fixed on the other shaft and meshing with the loose gear, wrist pins carried by the loose gear and adjustably connected with the outer eccentrics, a pinion relatively movable about said other shaft and meshing with the fixed gear, and means connected with said last named pinion for turning the same to alter the position of the shaft carrying the inner eccentrics.

2. In mechanism of the class described comprising a plurality of shafts, inner eccentrics fixed to one of the shafts, outer eccentrics loosely mounted on the inner eccentrics, gears on the shaft carrying the inner eccentrics, one gear being fixed and the other loose thereon, a pinion fixed on the other shaft and meshing with the loose gear, wrist pins carried by the loose gear and adjustably connected with the outer eccentrics, a pinion relatively movable about said other shaft and meshing with the fixed gear, means connected with said last named pinion for turning the same to alter the position of the shaft carrying the inner eccentrics, and means for clutching the last named means to said other shaft.

3. In mechanism of the class described comprising a plurality of shafts, inner eccentrics fixed to one of the shafts, outer eccentrics loosely mounted on the inner eccentrics, gears on the shaft carrying the inner eccentrics, one gear being fixed and the other loose thereon, a pinion fixed on the other shaft and meshing with the loose gear, wrist pins carried by the loose gear and adjustably connected with the outer eccentrics, a pinion relatively movable about said other shaft and meshing with the fixed gear, means connected with said last named pinion for turning the same to alter the position of the shaft carrying the inner eccentrics, means for clutching the last named means to said other shaft, and connections operated by the outer eccentrics to impart motion to machinery.

4. In mechanism of the class described comprising a plurality of shafts, inner eccentrics fixed to one of the shafts, outer eccentrics loosely mounted on the inner eccentrics, gears on the shaft carrying the inner eccentrics, one gear being fixed and the other loose thereon, a pinion fixed on the other shaft and meshing with the loose gear, wrist pins carried by the loose gear and adjustably connected with the outer eccentrics, a pinion relatively movable about said other shaft and meshing with the fixed gear, means connected with said last named pinion for turning the same to alter the position of the shaft carrying the inner eccentrics, means for clutching the last named means to said other shaft, connections operated by the outer eccentrics to impart motion to machinery, and a socketed portion associated with the last named means for accommodating a spanner or other tool to permit manual turning thereof.

In testimony whereof I affix my signature.

FRED M. ARNOLD.